W. N. EDGAR.
CORN HARVESTER.
APPLICATION FILED JAN. 16, 1913.
1,088,556.
Patented Feb. 24, 1914.
3 SHEETS—SHEET 3.
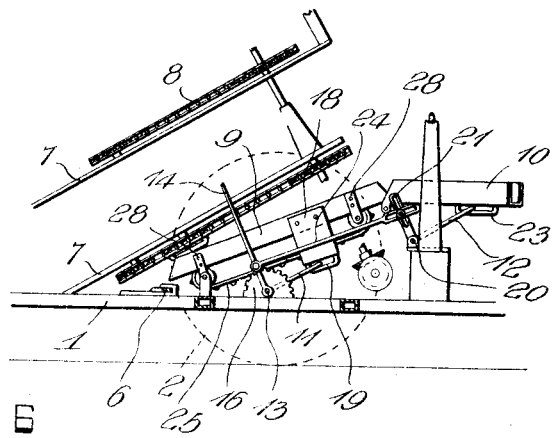
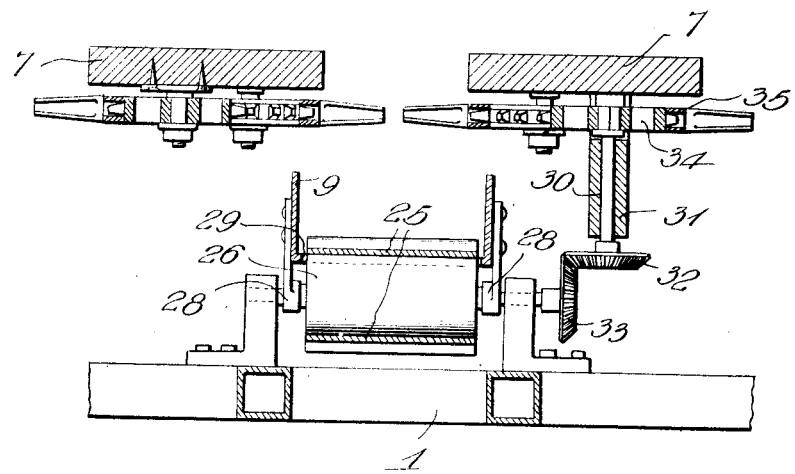
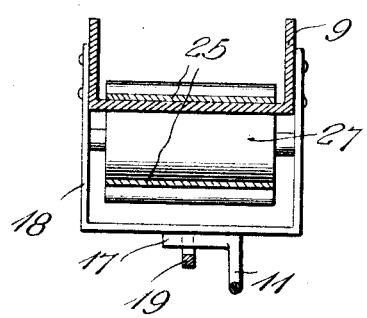
Witnesses
Inventor
William N. Edgar
Attorneys

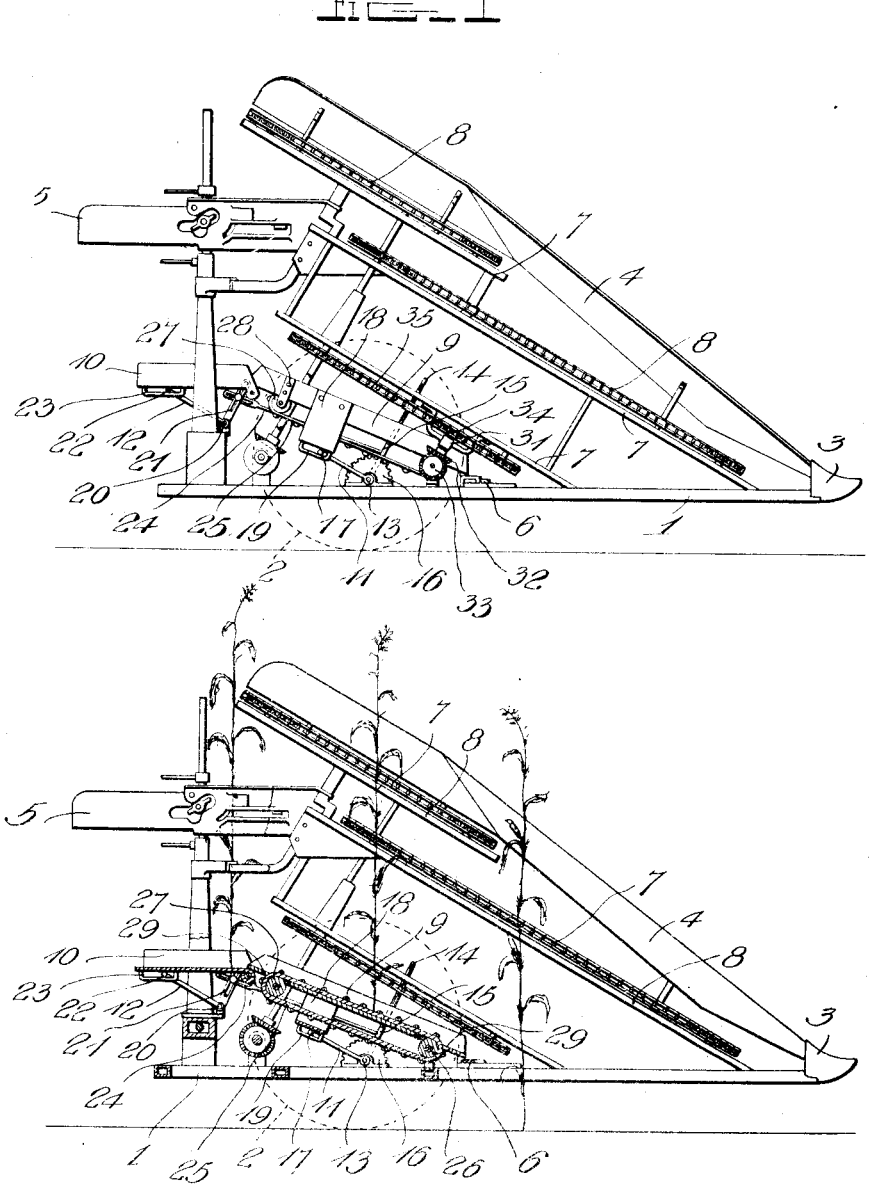

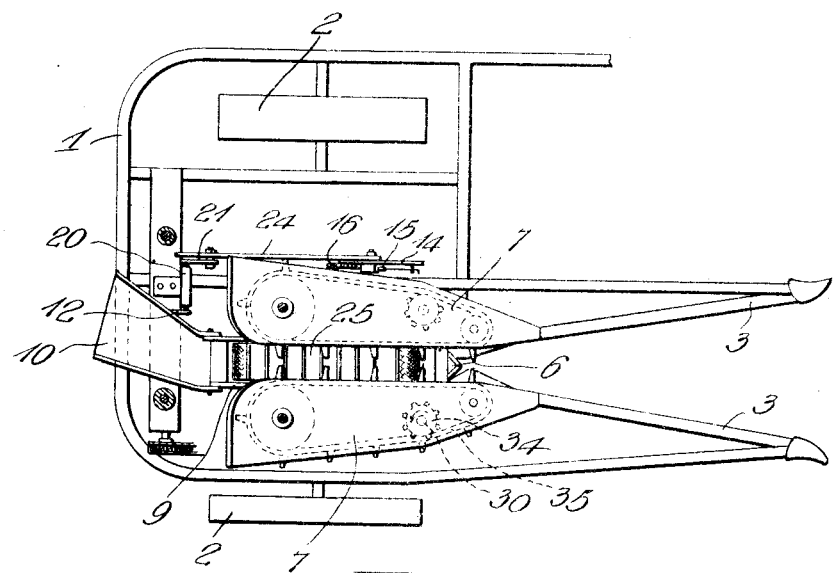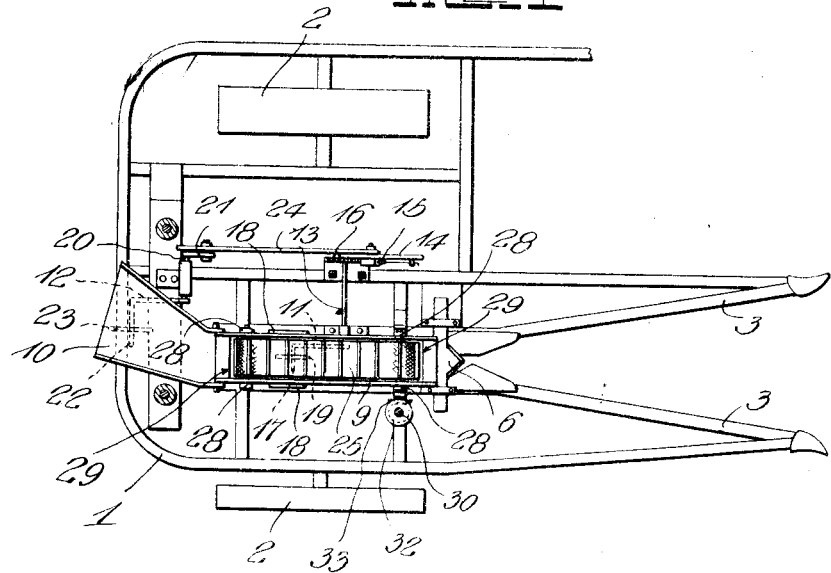

UNITED STATES PATENT OFFICE.

WILLIAM N. EDGAR, OF CAMBRIDGE, NEBRASKA.

CORN-HARVESTER.

1,088,556.  Specification of Letters Patent.  Patented Feb. 24, 1914.

Application filed January 16, 1913. Serial No. 742,460.

*To all whom it may concern:*

Be it known that I, WILLIAM N. EDGAR, a citizen of the United States, residing at Cambridge, in the county of Furnas and State of Nebraska, have invented certain new and useful Improvements in Corn-Harvesters; and I do declare the following to be a full, clear, and exact description of the invention, such as will enable others skilled in the art to which it appertains to make and use the same.

This invention relates to improvements in stalk supporting and conveying attachments for corn harvesters.

One object of the invention is to provide an endless conveyer adapted to receive the stalks after being cut by the cutting mechanism of the machine and to convey the cut stalks in an upright position to the binding or tying mechanism and which will also prevent the passage through which the stalks are carried from becoming clogged with weeds or trash.

Another object is to provide an attachment of this character which may be readily adjusted for conveying long or short corn and supporting the same in proper position to be tied.

With these and other objects in view, the invention consists of certain novel features of construction, and the combination and arrangement of parts as will be more fully described and claimed.

In the accompanying drawings; Figure 1 is a side view of a portion of a corn harvester showing the application of my improved stalk conveyer; Fig. 2 is a vertical longitudinal section thereof; Fig. 3 is a diagrammatic plan view looking down on the lower deck and feeding chains of the harvester and showing my improved conveyer below these parts; Fig. 4 is a similar view with the deck and stalk conveying chains removed, and looking directly upon my improved stalk conveying mechanism; Fig. 5 is a side view of a portion of the harvester looking toward the opposite side thereof from that shown in Fig. 1 and illustrating more particularly the arrangement of the levers for adjusting my improved stalk conveyer and platform; Fig. 6 is a vertical cross sectional view through a portion of the machine and taken substantially on a line with the lower supporting and operating roller of my improved conveying mechanism; Fig. 7 is a similar view of the improved endless stalk conveyer but looking in the opposite direction.

Referring more particularly to the drawings, 1 denotes the main frame of a corn harvester, 2 denotes the supporting wheels, 3 denotes the stalk gathering arms of the frame, 4 denotes the stalk engaging and supporting plates, 5 denotes the binding or tying mechanism, 6 denotes the stalk cutting mechanism, 7 denotes the supporting platform for the several inclined stalk carrying or gripping chains 8.

The foregoing parts as well as the other necessary parts ordinarily employed in connection with a complete harvester may be of the usual or any suitable construction and do not form a part of the present invention which consists of an improved construction and arrangement of stalk supporting and feeding mechanism whereby the stalks after being cut are supported and conveyed to the bundle forming and binding or tying mechanism of the machine.

My improved stalk supporting and conveying mechanism comprises a trough shaped frame or chute 9 which is disposed in the rear portion of the machine at a lesser angle to the horizontal than that of the several gripping chains, and has its lower end positioned immediately in rear of the stalk cutting mechanism. The frame or chute 9 is hingedly connected at its upper end with the platform 10 on which the stalks of corn are supported while being formed in bundles and tied. The hinged connection between the platform 10 and the chute 9 may be of any suitable construction. The frame or chute 9 and the platform 10 are adjustably supported in the harvester by front and rear supporting rods 11 and 12. The rod 11 for supporting the chute 9 has its inner end fixed to a rock shaft 13 mounted in suitable bearings on the frame of the machine and the shaft is provided at its outer end with a hand lever 14 having a spring projected pawl 15 adapted to be engaged with a segmental rack 16 whereby the lever 14 and the shaft 13 are locked in position when adjusted for operating the supporting rod 11, said shaft when thus locked holding the rod 11 in the position to which it has been adjusted for supporting the chute. The rear end of the supporting rod 11 has formed thereon a right angular inwardly extending finger 17 which has a sliding engagement with a yoke 18 secured to and depending from the lower side of the chute 9 as shown. The finger 17 is held in operative engagement with the yoke 18 by a keeper or guide loop 19 which is secured to the lower side of the yoke 18 as shown.

The supporting and adjusting rod 12 for the platform 10 is fixed on the inner end of a short rock shaft 20 which is also mounted in suitable bearings on the frame of the machine and which has fixed on its outer end a slotted crank arm 21. The rear end of the rod 12 has formed thereon a right angular inwardly extending finger 22 which has a sliding engagement with the bottom of the platform 10 and is held in operative engagement therewith by a guide loop 23 as shown. The slotted crank arm 21 of the shaft 20 has an adjustable connection with the slotted rear end of a connecting rod 24 the forward end of which is pivotally connected to the hand lever 14 whereby when said lever is operated to rock the shaft 13 and thus actuate the rod 11 for raising or lowering the chute 9, it will also operate the shaft 20 thereby actuating the rod 12 for raising or lowering the platform 10. The crank arm 21 and the connecting rod 24 are adjustably connected by a bolt which is engaged with the slotted ends of the crank arm and connecting rod as clearly shown in Fig. 5 of the drawings. By providing the supporting and operating mechanism for the chute 9 and platform 10 as herein shown and described it will be seen that these parts may be readily adjusted and supported for handling corn stalks of different height or length.

In order to facilitate the carrying of the stalks from the cutting mechanism of the machine to the platform 10 on which the stalks are supported while being bound into bundles, and to prevent them from dropping through the gripping chains in case the latter should not firmly grasp them, I provide the chute 9 with a stalk conveyer comprising an endless slatted belt or apron 25 which is engaged with and operated by front and rear rollers 26 and 27. The rollers 26 and 27 are revolubly mounted in suitable bearing brackets 28 secured to and projecting below the sides of the chute 9. The upper portions of the rollers 26 and 27 work through slots 29 through which the endless belt or apron also travels. The upper stretch of the belt or apron 25 when engaged and operated by the rollers 26 and 27 passes over and is supported on the bottom of the chute 9 between the sides thereof, said sides thus forming guides for holding the lower ends of the stalks in engagement with the conveyer apron.

The conveyer supporting and operating rollers and conveyer belt are driven by means of a short power transmitting shaft 30 which is mounted in a suitable bearing frame 31 secured to a portion of the frame of the machine. The shaft 30 is arranged at right angles to the lower deck and stalk conveying chain of the machine and at right angles to the shaft of the lower roller 26 of my improved stalk conveying mechanism.

Fixed on the lower end of the shaft 30 is a beveled gear 32 which has an operative engagement with a smaller gear 33 fixed on one end of the shaft of the lower roller 26. On the upper end of the shaft 30 is fixed a sprocket gear 34 which is in operative engagement with the inner side of the outer stretch of the adjacent stalk conveying chain 35 of the machine.

By constructing my improved stalk conveying mechanism as herein shown and described and gearing the latter to one of the stalk conveying chains it will be seen that the endless belt of the conveying mechanism will be operated in the proper direction for carrying the butts or lower ends of the stalks upwardly at the same speed that the upper portions of the stalks are being carried by the stalk conveying chains of the machine.

By disposing the several gripping chains at an equal inclination and the chute 9 and its conveyer apron 25 at a lesser inclination and beneath said chains, the latter alone are given the function of carrying the stalks obliquely upward until they release them and the stalks drop onto the platform 10; but in case any stalk should not be firmly gripped by the several chains and should have a tendency to drop vertically through them by reason of its weight, its lower end falls onto the apron 25 and it is carried onto the platform after all, rather than being permitted to drop into the machinery or through the machine onto the ground. I have found that the bushy condition of some corn permits occasional stalks whose leaves have not developed to an equal extent to drop through, the majority of the bushy corn being handled by the machine, and this detail of construction is provided to prevent such stalks from encumbering the machine or retarding its work. I have found also that if the chute and its apron are inclined to a greater degree than the several gripping chains, the tendency is for them to push the stalks upward through the gripping chains with the result that the leaves are entangled with such chains and the machine is clogged in that way. Moreover I have found that it is preferable to provide a rather wide flat trough or chute 9 and a correspondingly wide apron 25 moving over it, because the lower ends of the stalks are hard and are not so easily gripped between the chains as the upper and bushy portions thereof.

Having thus described my invention, what I claim is:

In a corn harvester, the combination with a framework, and several stalk-gripping and carrying chains mounted therein and connected with the supporting wheels, said chains being inclined upward and rearward at the same angle; of a cutting mechanism at the front end of said framework and beneath the lowest chain, a platform carried by said framework, a trough-shaped chute leading from said mechanism to the platform and standing at a lesser inclination than said chain, rollers across the ends of said chute, an endless apron moving around said rollers and its upper side traveling upward over the chute, an upright drive shaft connected with one of said rollers, and a sprocket gear on said shaft engaged by one of said gripping chains.

In testimony whereof I have hereunto set my hand in presence of two subscribing witnesses.

WILLIAM N. EDGAR.

Witnesses:
 G. E. SIMON,
 G. C. PROUD.